May 17, 1949.　　　　W. N. RUSSELL　　　　2,470,650
MACHINE FOR MAKING REINFORCED CONCRETE BEAMS
Filed Jan. 16, 1948　　　　6 Sheets-Sheet 2
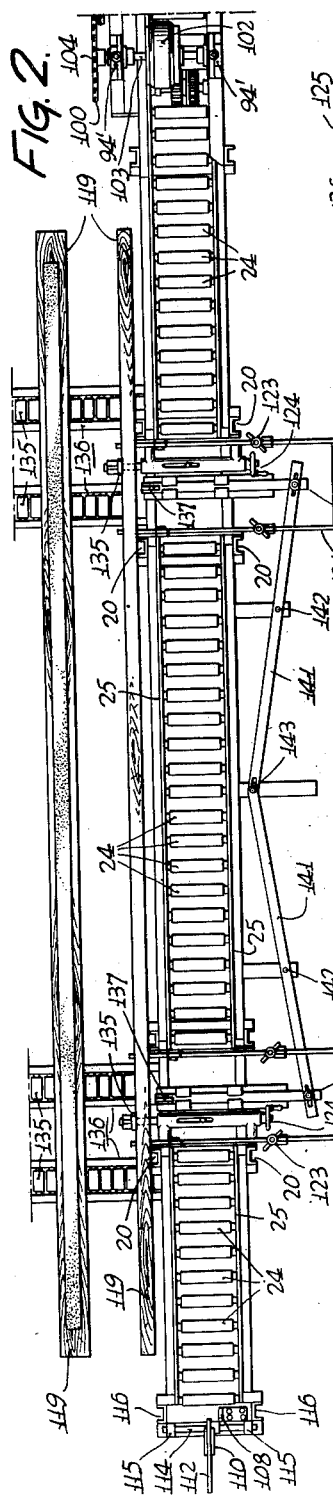
Inventor:
William N. Russell
by his Attorneys
Howson & Howson

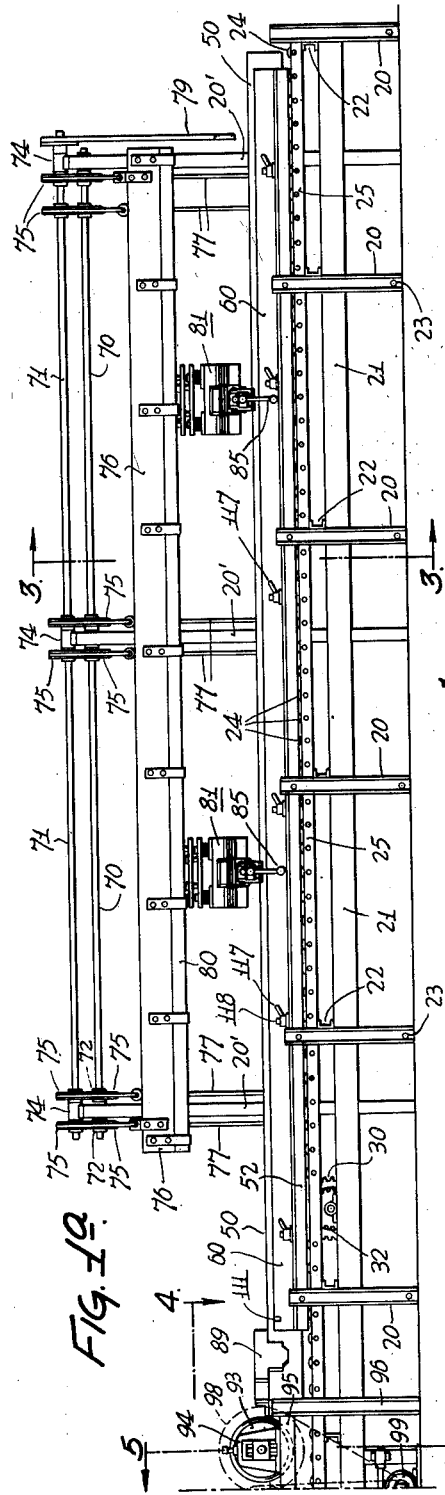

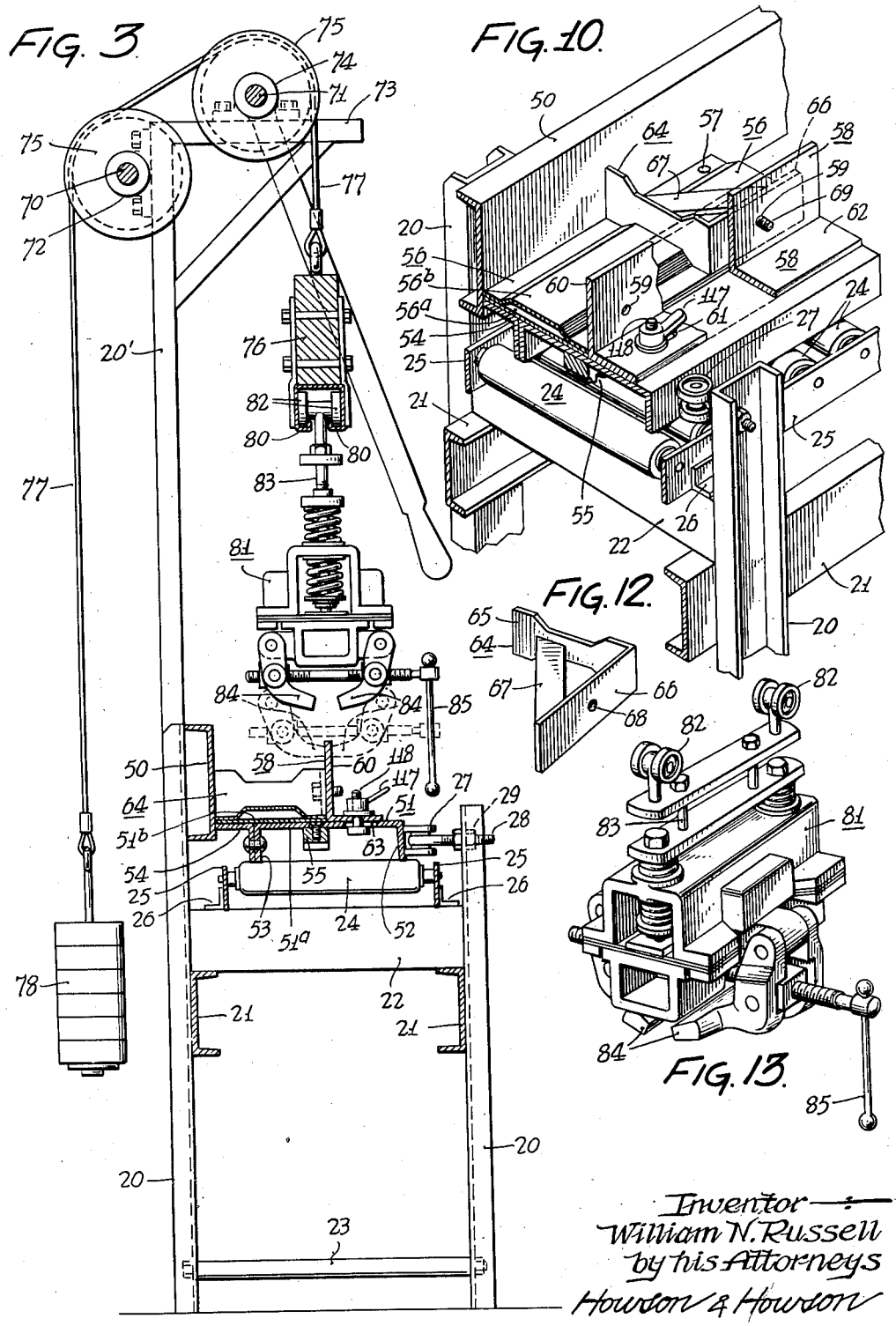

May 17, 1949.  W. N. RUSSELL  2,470,650
MACHINE FOR MAKING REINFORCED CONCRETE BEAMS
Filed Jan. 16, 1948  6 Sheets-Sheet 4

Inventor
William N. Russell
by his Attorneys
Howson & Howson

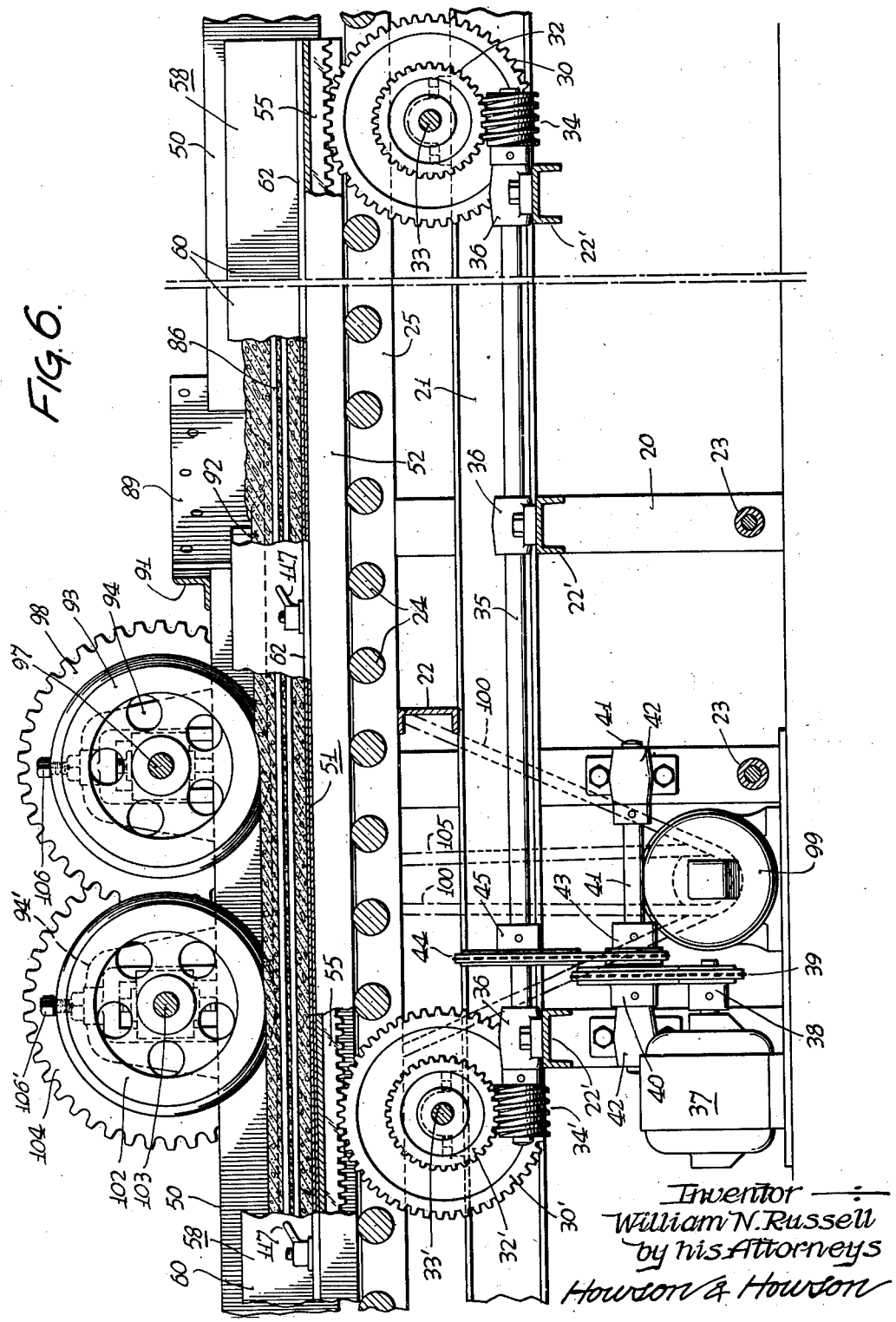

May 17, 1949.  W. N. RUSSELL  2,470,650
MACHINE FOR MAKING REINFORCED CONCRETE BEAMS
Filed Jan. 16, 1948  6 Sheets-Sheet 6

Inventor:
William N. Russell
by his Attorneys
Howson & Howson

Patented May 17, 1949

2,470,650

UNITED STATES PATENT OFFICE 2,470,650

MACHINE FOR MAKING REINFORCED CONCRETE BEAMS

William N. Russell, Philadelphia, Pa.

Application January 16, 1948, Serial No. 2,607

21 Claims. (Cl. 25—41)

This invention relates to molding machines and more particularly to machines for molding reenforced concrete beams and the like.

A principal object of the invention is to provide a highly efficient and generally improved molding machine of this class.

A more specific object of the invention is to provide a molding machine including a mold, one side wall of which is relatively fixed, together with means for moving the other elements of the mold to a position clear of said relatively fixed wall to thereby facilitate ejection of the molded article from the machine.

Another object of the invention is to provide a molding machine comprising improved means for ejection of the molded article including an improved mobile mold structure in conjunction with means for tilting said structure from a normal horizontal to a substantially vertical position for removal of the molded article.

Still another object of the invention is to provide a highly efficient and practical mold-vibrating device for insuring proper settling of the molding materials in the mold.

The invention resides further in certain novel and advantageous structural and mechanical details hereinafter appearing.

Further objects will be apparent from the specification and drawings in which:

Fig. 1a is an elevation of the pouring section of a concrete beam machine constructed according to the invention;

Fig. 1b is an elevation of the tilting structure of the beam machine and a continuation of Fig. 1a;

Fig. 2 is a plan of the structure of Fig. 1b;

Fig. 3 is an enlarged section along the line 3—3 of Fig. 1a;

Fig. 5 is an enlarged section along the line 5—5 of Fig. 1a;

Fig. 6 is a section along the lines 6—6 of Fig. 5;

Fig. 9 is an enlarged perspective showing the details of one of the tilting tables of Fig. 1b;

Fig. 10 is an enlarged perspective showing one end of the mold in an advanced position on the conveyer;

Fig. 11 is an enlarged perspective showing the opposite end of the mold fully advanced on the conveyer bed;

Fig. 12 is a perspective showing the construction of one of the end plates for the mold;

Fig. 13 is a perspective showing one of the electromagnetic vibrating devices; and Fig. 14 is a perspective, partly sectioned, of a finished concrete beam as manufactured on the machine.

Figure 5:
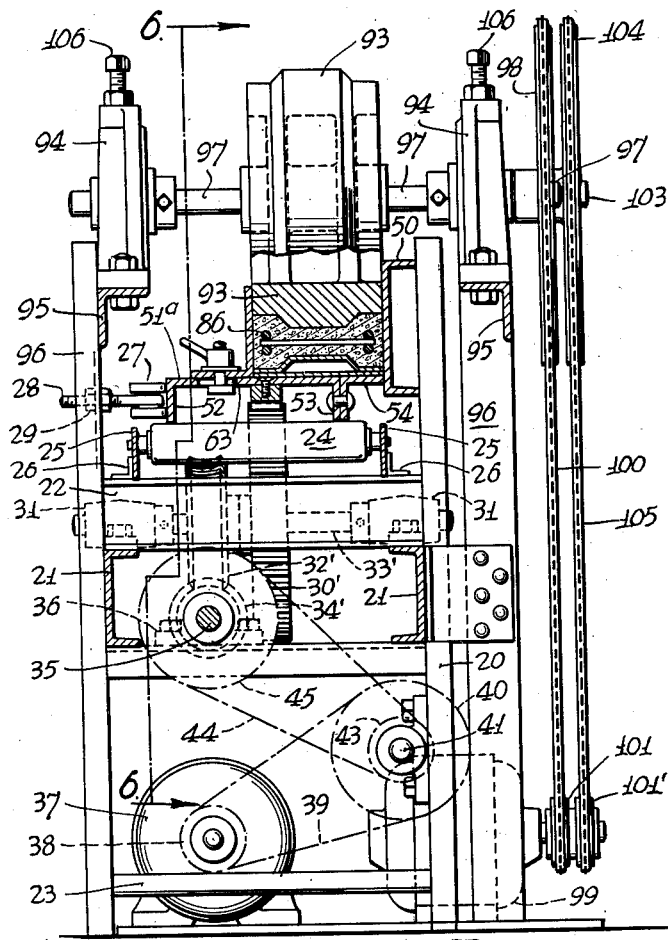

The invention comprises essentially the provision of an elongated conveyer table and a sectional mold adapted to be moved along the conveyer bed by means of a rack on the underside of the mold which engages pinions positioned under the conveyer. The mold comprises a fixed side member against which the movable sections of the mold are held when the concrete is poured. A counterbalanced electro-magnetic vibrating apparatus is movably suspended above the mold and, when in a lowered position, is adapted to be clamped to the mold in order to settle the slurry quickly after it is poured.

A scraper as well as primary and secondary finishing rolls are positioned over the conveyer to engage the exposed beam surface as it is advanced along the conveyer bed with the mold by means of the rack and pinions. After the beam has completely passed under the secondary finishing roll and become disengaged from the final driving pinion, it is positioned on an extension of the conveyer bed which is provided with a loosening device for freeing one mold section, and also a pair of tilting tables to turn the mold and beam 90° on its longitudinal axis. An ejector is then operated to expel the beam from the mold which may then be returned to the other end of the machine to repeat the process. Transverse conveyers carry the completed beams to a convenient location for storage and further setting.

The features of the machine which are of especial importance are the sectional construction of the mold itself, including quickly removable end plates, a fixed side plate, and a longitudinally and laterally movable opposite side plate; and the construction of the ejecting devices which enable the transfer of the beam from the movable mold section to a plank by means of novel tilting and disengaging devices effecting a much more efficient production of reinforced concrete I-beams than has been possible heretofore.

The conveyer bed assembly

Referring now more particularly to Figs. 1a and 1b, the beam fabricating machine comprises a conveyer assembly supported on vertical posts or channels 20, 20 spaced longitudinally along the conveyer and connected lengthwise by a pair of rails 21, 21 which also may be in the form of channel sections. Upper transverse members 22, 22 are supported on rails 21, and attached to posts 20. Lower tierods 23 laterally support the conveyer assembly through posts 20. The conveyer rollers 24, 24 are journaled in side members 25, 25 which are in turn secured to upper cross members 22 by means of suitable angle brackets 26 (Fig. 3). The side members 25 extend the full length of the conveyer structure in Fig. 1a but are interrupted at the tilting devices of Fig. 1b for a purpose to be described more fully hereinafter.

A plurality of side spacer rollers 27 are adjustably mounted near the upper extremities of posts 20 by means of eye bolts 28 and locknuts 29. Shafts 33, 33' carrying pinions 30 and 30' respectively are mounted on pillow blocks 31, 31' on side rails 21, at points near the mid-section of the conveyer bed. Wormwheels 32 and 32' are keyed to pinion shafts 33 and 33' coaxially with the pinion 30 and engage with worms 34 and 34' on countershaft 35 which in turn is longitudinally journaled in bearings 36, supported on cross-channels 22, 22' attached to the underside of rails 21, 21 (Fig. 6). An electric motor 37 drives pinions 30 and 30' through sprocket 38 on the motor shaft, chain 39, large sprocket 40 on jackshaft 41 journaled at 42, 42, small sprocket 43 on jackshaft 41, chain 44, and sprocket 45 on countershaft 35.

In effect, the conveyer bed is comprised of two sections,—the first being utilized to pour and settle the concrete, and the second to eject the beam from the mold as hereinafter described. The pinions 30 and 30' serve merely to transfer the mold from the first section to the second section, during which operation the trimming and smoothing operations are performed, also as hereinafter fully described.

The mold

A reinforced concrete I-beam such as that shown in Fig. 14, may be made of any desired length or cross-sectional dimension by means of a sectional mold which has a fixed side 50 permanently attached to upright posts 20. The base 51 of the mold is formed of an inverted channel section 51a having downwardly extending webs 52 and 53, to the latter of which is secured an angle member 51b so that the upper portion of the base presents a flat surface. The downwardly extending webs of the base 51 are arranged to run on rollers 24 and the member 51b presents a laterally extending flange 54 for sliding abutment with the face of side wall 50. The adjustment of the rollers 27 by way of eye bolts 28 and locknuts 29 provides for guiding the base 51 with suitable lateral clearance or free sliding contact between flange 54 and side member 50. A rack 55 secured to the underside of base 51 is in alignment with pinions 30, 30'. The mold bottom or palette 56 comprises a plate 56a to which is welded a centrally raised member 56b having the desired I-beam contour, and the palette is secured to the base 51 by means of bolts 57, see Fig. 10.

The opposite side of the mold is formed by an angle member 58 having a series of holes 59 in its vertical web 60 and a series of longitudinal slots 61 in its horizontal web 62. Transverse adjustment of side wall 58 with respect to base 51 is afforded by slots 63 in the base 51a so that side 58 may be adjusted laterally to abut palette 56 as shown in Fig. 10. Furthermore, the lateral adjustability of side member 58 permits the manufacture of various size beams simply by replacing the palette 56 with narrower or wider palettes. Bolts 118, equipped with wingnuts 117, are installed in slots 63 and 61 to lock the member 58 in place.

The mold ends 64, see Figs. 10 and 12, have the same shaped face 65 as the cross-section of the I-beam to be produced. A leg 66 rigidly attached to one end of face 65 and supported by means of brace 67 is provided with a hole 68 by which it may be attached to web 60 with bolt 69 inserted through any desired hole 59 in accordance with the length of the I-beam to be poured. It will be understood that identical mold ends are used at each end of the mold.

The shaker

Referring now to Fig. 1a, three of the vertical posts 20, indicated by reference numeral 20', extend vertically above the conveyer bed and support a pair of shafts 70 and 71, the former of which is journaled to posts 20' by bearings 72, 72 and the latter of which is journaled to overhanging brackets 73, 73 by bearings 74, 74. Shafts 70 and 71 carry pulleys 75, 75 located on opposite sides of each journal 72 and 74. A beam 76 is suspended from pulleys 75 by means of cables 77 and counterweights 78 and is adapted to be raised and lowered with respect to the conveyer by means of lever 79 keyed to shaft 71. The lower edge of beam 76 is provided with a track 80 along which the vibrator assemblies 81 may be moved by means of rollers 82 and hangers 83. Each vibrator 81 is provided with a pair of jaws 84 which may be clamped to and released from web 60 of side member 58 by means of handles 85, 85 (Fig. 3). The construction and operation of the electro-magnetic vibrators 81 is well known and forms no part of the invention. Devices of this type are available on the market and an example of such is the product manufactured by the Syntron Company of Homer City, Pennsylvania.

The effect of the vibrators is to settle the slurry to a semi-solid state in which it will be self-supporting. It will be understood that a damp rather than a wet mix is used for the slurry so that the operation may be completely continuous. In practice, the vibrators need only be operated for a matter of seconds until the desired settling has been achieved.

When the mold is in the position shown in Fig. 1a, the slurry is poured into the mold between sides 50, 60 and ends 64 until approximately half the mold is filled. Then the reinforcing steel strut 86 (Fig. 14) is laid lengthwise on the slurry and tamped into place if necessary. The remainder of the slurry is then poured into the mold until it is filled, then the vibrators 81 are lowered into operative position by means of lever 79, and jaws 84 are securely clamped to the web 60. The vibrators are electrically energized until the slurry is fully settled, whereupon they may be unclamped and raised to the position shown in Figs. 1a and 3, by means of lever 79. The beam, which is in a semi-solid state, is now ready for the trimming operation.

Trimming and finishing

Figure 4:
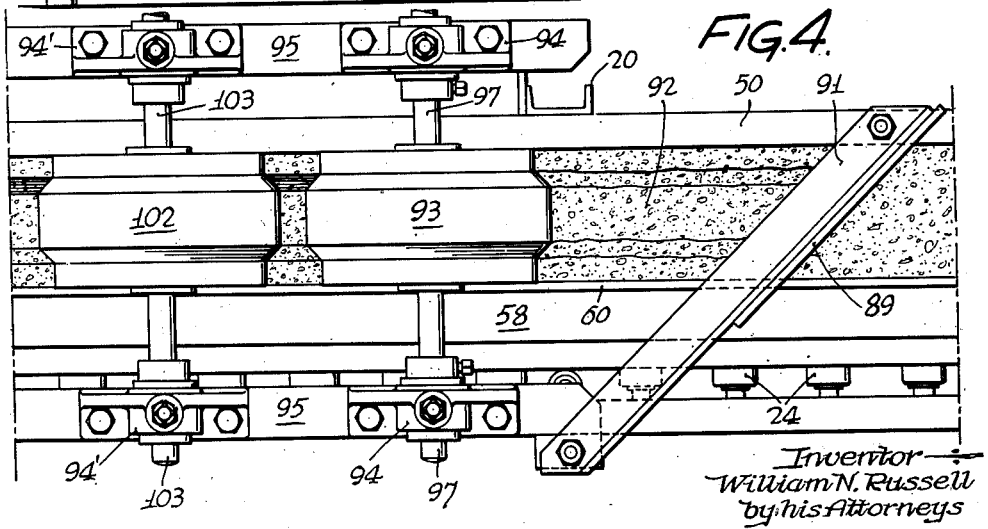
Fig. 4 is an enlarged detail in plan as seen at 4—4 in Figs. 1a and 1b.

After vibrators 81 have been raised as mentioned above, motor 37 is started, thereby rotating pinions 30, 30', the former of which is in engagement with the rack 55 on the underside of the mold base 51. This causes the entire mold, with the exception of the fixed wall 50, to move longitudinally along the conveyer bed under scraper 89 which removes any excess slurry. The scraper 89 (Figs. 1a and 4) is diagonally supported on fixed wall 50 and elongated post 90 by means of angle iron 91. The lower edge of scraper 89 is shaped to conform to the I-beam section being poured and has the primary function of routing out the groove 92 on the upper side of the beam.

A rough or primary finishing roll 93 is adjustably supported directly in back of scraper 89 by means of adjustable bearings 94, 94 and 94′, 94′ which are in turn conveniently bolted to cross members 95, 95 on upright posts 96, 96. The periphery of roll 93 is also shaped to conform to the I-beam section and is keyed to shaft 97 which is driven by a sprocket 98 connected to an electric motor 99 through chain 100 and motor sprocket 101 (Figs. 5 and 6).

A smooth or final finishing roll 102 constructed and mounted identically with roll 93 but directly in back of it and adjusted slightly lower than roll 93 as shown in Fig. 6 is likewise driven by motor 99 through shaft 103, sprocket 104, chain 105 and motor sprocket 101′. Suitable vertical adjustment for both rolls is made by means of adjusting screws 106, 106 and 106′, 106′ on bearings 94 and 94′ respectively. After the mold and beam have passed completely under finishing roll 102, the molding process is completed. The fixed wall 50 is terminated immediately beyond the finishing roll 102, see Fig. 1b, so that when the mold and beam have passed under roll 102, and onto the section of the machine shown in the latter figure, one side of the beam is entirely unsupported. Furthermore, it will be noted that drive pinion 30′ is located near to and in back of roll 102 in order that the rack 55 may become disengaged as soon as the final finishing operation has been completed. Therefore, during most of the trimming operation, the mold is being driven by both pinions 30 and 30′.

The extractor

When the rack has become disengaged from pinion 30′, the mold with the beam is then advanced by hand along the conveyer bed until it abuts the limit stop 108 (Fig. 11). The mold ends 64 are then removed and pin 109 in link 110 is inserted in a notch 111 near the forward end of web 60. Link 110 is pivotally connected to lever 112 by means of pin 113 and the lever is mounted on shaft 114 journaled in blocks 115, 115 on posts 116, 116 (Fig. 11).

Figure 7:
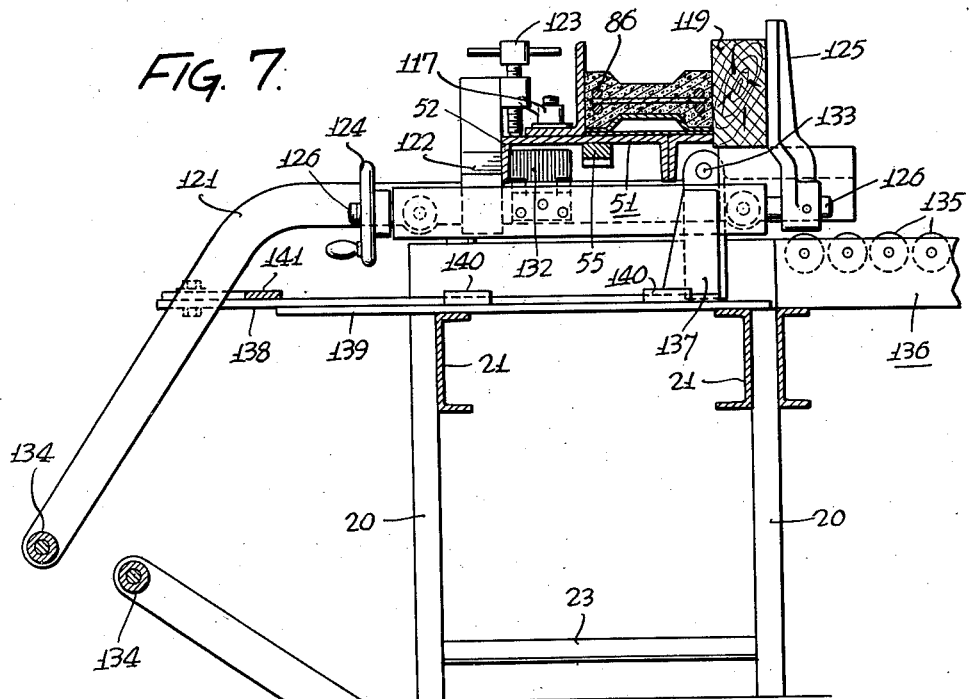
Fig. 7 is an enlarged section along the lines 7—7 of Fig. 1b.

Mold side 58 is then freed from the beam and the wall as well as palette 56 by loosening wingnuts 117 on bolts 118 in slots 61, and striking lever 112 a sharp blow so that the side 58 is driven longitudinally with respect to base 51 within the confines of slots 61. Link 110 is then disengaged from the notch 111 and a suitable plank 119 positioned on supports 120, 120 (Fig. 9) to take the place of wall 50. The mold is then clamped to the tilting table side members 121, 121 by means of a slidable clamp 122 having a T-handle clamp screw 123. The tightening of the clamp screw 123 operates to compress the web 52 of base member 51 securely against frame members 121 as shown in Fig. 7.

Plank 119 is then clamped to the exposed side of the I-beam by means of handwheels 124 and dogs 125 attached to shafts 126. Housing 127 is adapted to guide the movement of shafts 126 transversely of the conveyer bed and the shafts are prevented from turning with respect to housing 127 by means of teats 128 on the shaft which operate in slots 129 in the housing. Bosses 130 on the housings are rigidly secured to frame members 121 by bolts 131 as shown in Fig. 9.

A hinge-like indexing lug 132 is likewise attached to frame member 121 and acts as a transverse limit stop to insure correct lateral positioning of the mold so that plank 119 will be at the proper vertical position with respect to both of the transverse conveyers. The tilting table frames 121, 121 are pivoted at 133, 133 near one side of the conveyer and are connected at their opposite ends by means of handle 134. In the embodiment illustrated, the tilting arrangement is comprised of two identical tilting tables as shown in Fig. 2 but it will be understood that any convenient number may be employed depending upon the length of the beams to be fabricated. Furthermore, the construction and operation of each tilting table assembly is identical and therefore it is believed to be unnecessary to repeat the description thereof.

Figure 8:
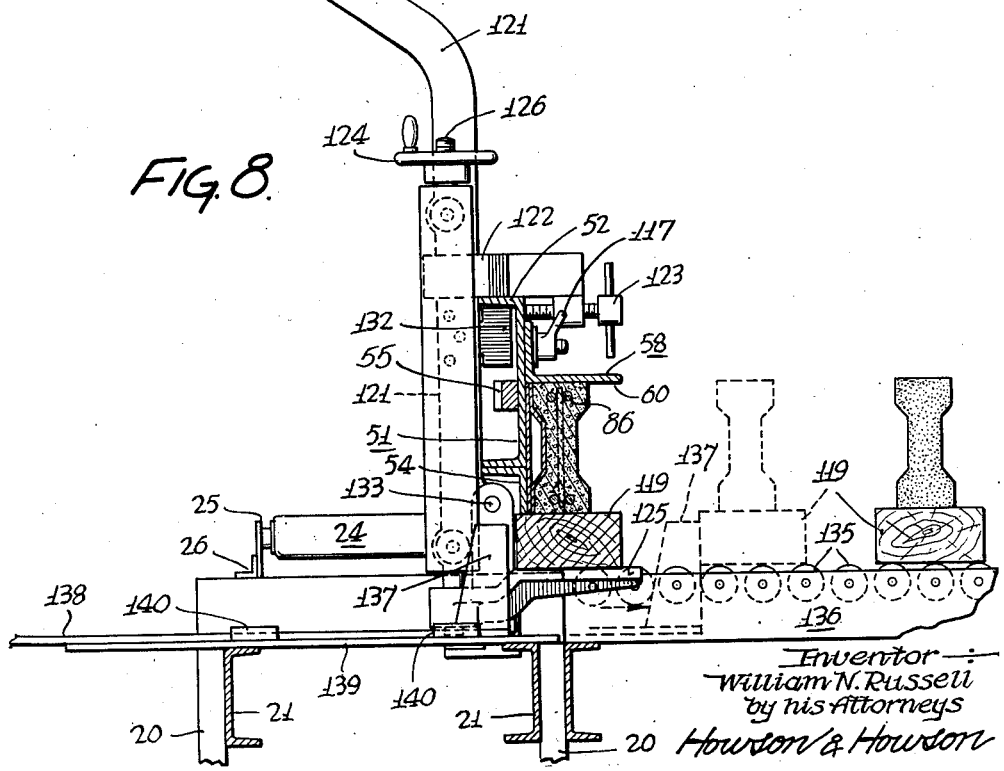
Fig. 8 is a section similar to Fig. 7 but with the tilting table in a raised position.

When the mold together with the beam, has been securely clamped in the tilting table assemblies as described above, handle 134 is raised to turn both the mold and the beam 90° along its longitudinal axis on pivots 133 as shown in Fig. 8. In this tilted position the bottom of plank 119 rests on rollers 135 in transverse conveyer assemblies 136, 136. Since the side wall 58 has previously been freed from the beam, handwheels 124 may be loosened, thus permitting the beam to be supported by plank 119. The ejector is then operated to expel the beam from the mold while it is at all times supported on the plank. The ejector comprises pressure plates 137 mounted on bars 138, 138 slidably supported by plates 139, 139 and guide blocks 140, 140. A toggle consisting of arms 141, 141 fulcrumed at 142, 142 serves to slide the bars 138 and pressure plates 137 at right angles to the main conveyer bed until the plates 137 contact plank 119. The tops of plates 137 terminate below the top of plank 119 in order that ample clearance between the web 54 in the position of Fig. 8, is provided. In the raised position of Fig. 8, the mold is retained in proper elevated clearance with respect to the conveyers by means of the lugs 132 and clamp screws 123. When the center pivot 143 of the toggle is pulled away from the conveyer bed as seen in Fig. 2, the plank and beam are moved out onto transverse conveyers 136 as shown in dotted lines in Fig. 8. Each tilting table is provided with an ejector and when two tables are used, as shown in the preferred embodiment, the ejectors are operated simultaneously by the toggle.

When the beam and plank have been disengaged from the mold, toggle bars 141 are returned to the retracted position of Fig. 2, tilting frames 121, 121 are lowered to the initial position, clamping screws 123 loosened and indexing lugs 132 are pivoted to the downward position of Fig. 9, whereupon the mold is returned to the pouring section of the conveyer as shown in Fig. 1a.

Side 58 is then reset in its proper position and secured by tightening wingnuts 117 on bolts 118 whereupon the pouring operation may be repeated.

The entire structure is relatively inexpensive and enables reinforced concrete beams to be fabricated with great speed and efficiency. The insertion of the reinforcing member is greatly simplified and the removal of the beam from the mold is accomplished in a matter of a few seconds.

I claim:

1. In a molding machine the combination with an elongated conveyor of a relatively fixed upright wall member substantially parallel to and adjoining one side of the conveyor, a carriage mounted for movement on the conveyor and having one edge thereof contiguous to the surface of said upright wall member, said carriage forming the bottom wall of a mold of which the said upright wall member forms one side, and opposite side and end wall mold members supported on said carriage, said conveyor extending beyond an end of the side wall member so as to permit movement of the bottom, the other side and the end walls of said mold to a position clear of the relatively fixed side wall.

2. A molding machine according to claim 1 wherein laterally adjustable guides are provided for the carriage at the opposite side of the conveyor from said relatively fixed wall member.

3. A molding machine according to claim 1 wherein the said other side end mold wall members of the mold are adjustably supported on the carriage.

4. A molding machine according to claim 1 wherein vibrating mechanism is provided for the mold in that portion of the machine embraced by the relatively fixed side wall member.

5. A molding machine according to claim 4 wherein the vibrating mechanism includes means for detachably clamping the vibrating devices to the side wall of the mold which is movable with the carriage.

6. A molding machine according to claim 1 including power mechanism for traversing the carriage on the conveyor.

7. A molding machine according to claim 6 wherein the said traversing mechanism includes a power-driven pinion and a cooperating rack carried by and extending longitudinally of said carriage.

8. A molding machine according to claim 1 including a scraper element operatively associated with the relatively fixed side wall member to remove excess material from the top of the mold when the carriage is traversed on the conveyor.

9. A molding machine according to claim 1 wherein a forming roll is operatively associated with the relatively fixed wall member to compact and shape the top of the molded material when the carriage is traversed on said conveyor.

10. A molding machine comprising a molding section and an extractor section, an elongated conveyor embracing both of said sections, a carriage mounted for movement on said conveyor between the molding and extractor sections, and comprising a base member forming the bottom of a mold and upright members forming the opposite end walls and one side wall of said mold, and a relatively fixed upright wall member at one side of said conveyor in proximity to an edge of the said base member so as to form the opposite side wall of said mold, said wall member terminating in the molding section of the machine so that when the carriage is traversed to the extractor section the one side of the mold formed by the relatively fixed wall member is left open.

11. A molding machine according to claim 10 wherein means is provided in the said extractor section for tilting the said base member of the carriage upwardly toward the open side of the mold into an upright position.

12. A molding machine according to claim 11 wherein means is provided for clamping a temporary wall member at the open side of said mold preparatory to the said tilting operation.

13. A molding machine according to claim 11 wherein the said tilting means comprises also a means for releasably securing a temporary wall member against the open side of said mold.

14. A molding machine according to claim 13 wherein a transverse conveyor means is provided on the said open side of said mold in a position to receive said temporary side wall member when the carriage has been tilted to a substantially upright position.

15. A molding machine according to claim 10 wherein the extractor section comprises a tiltable structure normally underlying the conveyor, together with means for elevating said structure so as to lift the carriage from the conveyor and to carry it to an upright position at one side of the latter.

16. A molding machine according to claim 15 wherein means is provided for clamping the carriage to said tiltable structure.

17. A molding machine according to claim 16 wherein said clamping means includes a temporary side wall member for the open side of the mold.

18. A molding machine according to claim 17 wherein transverse conveyor means is provided for reception of the temporary wall member when the tiltable structure is in the elevated position.

19. A molding machine according to claim 18 wherein means is provided for ejecting the temporary wall member from the mold structure onto said conveyor.

20. A molding machine according to claim 10 wherein power-driven means is provided for traversing the carriage from the mold section to the ejector section together with means for disengaging the traversing mechanism from the carriage when the latter has moved entirely to the ejector section.

21. A molding machine according to claim 10 wherein means is provided in the ejector section for forcibly moving the side wall of said mold supported by the carriage.

WILLIAM N. RUSSELL.

REFERENCES CITED

The following references are of record in the file of this patent:

UNITED STATES PATENTS

| Number | Name | Date |
|---|---|---|
| 804,528 | Fischer et al. | Nov. 14, 1905 |
| 1,087,475 | White, Jr. et al. | Feb. 17, 1914 |
| 2,066,846 | McNeil | Jan. 5, 1937 |
| 2,082,721 | Sanford | June 1, 1937 |
| 2,394,227 | Barber | Feb. 5, 1946 |